United States Patent
Soquet

(10) Patent No.: US 9,836,387 B1
(45) Date of Patent: Dec. 5, 2017

(54) SYSTEM AND METHOD FOR IMPLEMENTING A DEBUGGER AS A SERVER

(71) Applicant: Marvell International Ltd., Hamilton (BM)

(72) Inventor: Patrick Soquet, Chastre (BE)

(73) Assignee: MARVELL INTERNATIONAL LTD., Hamilton (BM)

( * ) Notice: Subject to any disclaimer, the term of this patent is extended or adjusted under 35 U.S.C. 154(b) by 245 days.

(21) Appl. No.: 14/870,540

(22) Filed: Sep. 30, 2015

Related U.S. Application Data

(60) Provisional application No. 62/079,329, filed on Nov. 13, 2014.

(51) Int. Cl.
 *G06F 9/45* (2006.01)
 *G06F 11/36* (2006.01)
(52) U.S. Cl.
 CPC ................. *G06F 11/3664* (2013.01)
(58) Field of Classification Search
 CPC . G06F 11/3664; G06F 9/45504; G06F 11/261
 USPC .......................................................... 717/134
 See application file for complete search history.

(56) References Cited

U.S. PATENT DOCUMENTS

| | | | |
|---|---|---|---|
| 2015/0033078 A1* | 1/2015 | Wintergerst | G06F 11/362 714/38.1 |
| 2015/0033205 A1* | 1/2015 | Wintergerst | G06F 11/362 717/124 |
| 2015/0058824 A1* | 2/2015 | Smiljanic | G06F 11/3664 717/125 |
| 2016/0378641 A1* | 12/2016 | Tamm | G06F 11/3644 717/125 |

* cited by examiner

*Primary Examiner* — John Chavis

(57) ABSTRACT

Systems and methods are provided for debugging applications. A non-transitory machine-readable storage medium is configured to store code. A processor operative to execute the code is coupled to the non-transitory machine-readable storage medium. The code includes a debugger configured to: establish a first connection with a first virtual machine, where the first virtual machine is configured to initiate the first connection with the debugger; receive, from the first virtual machine, a first set of data via the first connection established between the debugger and the first virtual machine, where the first set of data includes data associated with a first application running on the first virtual machine, and where the first virtual machine is further configured to transmit the first set of data to the debugger when the first application breaks, and display, on a graphical user interface (GUI), at least a portion of the first set of data.

21 Claims, 8 Drawing Sheets

SYSTEM AND METHOD FOR IMPLEMENTING A DEBUGGER AS A SERVER

CROSS-REFERENCE TO RELATED APPLICATIONS

This application claims priority to U.S. Provisional Application No. 62/079,329, filed Nov. 13, 2014, entitled "Debugger Server," the entirety of which is herein incorporated by reference.

TECHNICAL FIELD

The technology described herein relates generally to software debuggers and more particularly to software debuggers that accept connections from applications being debugged.

BACKGROUND

A debugger is an important tool in the development of software applications. A debugger can be particularly useful in software development that uses dynamic, interpreted, or otherwise runtime checked languages, like JavaScript, because programming errors in such languages may only be discoverable at run time.

Debuggers are often included as part of a packaged development environment that includes editing, building, launching, and profiling functionality for application development. Typically a debugger operates as a client and the application operates as a server. The debugger connects to the application after the application has launched in an environment. The debugger sends commands and requests to the application and receives data associated with the operation of the application. Such commands can include commands to run the application until completion or an error, to set a breakpoint, to run the application until an event (e.g., a breakpoint) occurs, and to run the application for one or more instruction steps. Requests can include requests to inspect the application stack, heap, and current property values.

SUMMARY

Systems and methods are provided for debugging applications. A non-transitory machine-readable storage medium is configured to store code. A processor operative to execute the code is coupled to the non-transitory machine-readable storage medium. The code includes a debugger configured to: establish a first connection with a first virtual machine, where the first virtual machine is configured to initiate the first connection with the debugger; receive, from the first virtual machine, a first set of data via the first connection established between the debugger and the first virtual machine, where the first set of data includes data associated with a first application running on the first virtual machine, and where the first virtual machine is further configured to transmit the first set of data to the debugger when the first application breaks, and display, on a graphical user interface (GUI), at least a portion of the first set of data received from the first application running on the first virtual machine.

As another example, a method performed by a debugger operating at a server for debugging applications includes establishing a first connection with a first virtual machine, where the first virtual machine is configured to initiate the first connection with the debugger. The method further includes receiving, from the first virtual machine, a first set of data via the first connection established between the debugger and the first virtual machine, where the first set of data includes data associated with a first application running on the first virtual machine, and where the first virtual machine is further configured to transmit the first set of data to the debugger when the first application breaks. The method further includes displaying, on a graphical user interface (GUI), at least a portion of the first set of data received from the first application running on the first virtual machine.

As a further example, a non-transitory machine-readable storage medium has computer code stored therein. The computer code includes a debugger configured to: establish a first connection with a first virtual machine, where the first virtual machine is configured to initiate the first connection with the debugger; receive, from the first virtual machine, a first set of data via the first connection established between the debugger and the first virtual machine, where the first set of data includes data associated with a first application running on the first virtual machine, and where the first virtual machine is further configured to transmit the first set of data to the debugger when the first application breaks; and display, on a graphical user interface (GUI), at least a portion of the first set of data received from the first application running on the first virtual machine.

As additional examples, in one embodiment the code further includes the first virtual machine. In one example, the first virtual machine operates at a first remote device. The server and the first remote device communicate with each other via a firewall in one embodiment. In one instance, the first set of data further includes data associated with one or more of: (i) a state of the first virtual machine, (ii) a heap of the first virtual machine, or (iii) a stack of the first virtual machine. In one embodiment, the debugger is further configured to send one or more commands to the first virtual machine after the first application breaks. In an example, the one or more commands includes one or more of: (i) a command to run the first application, (ii) a command to step a source code associated with the first application, (iii) a command to request for object status, or (iv) a command to set a breakpoint in the first application. In one embodiment of the disclosure, the debugger is further configured to: establish a second connection with a second virtual machine, where the second virtual machine is configured to initiate the second connection with the debugger; receive, from the second virtual machine, a second set of data via the second connection established between the debugger and the second virtual machine, where the second set of data includes data associated with a second application running on the second virtual machine, and where the second virtual machine is further configured to transmit the second set of data to the debugger when the second application breaks; and display, on the GUI, at least a portion of the second set of data received from the second application running on the second virtual machine, where the first application and the second application are configured to communicate with each other, thereby allowing the first application and the second application to be debugged while operating in their normal environment. In one instance, the first virtual machine operates at a first remote device, the second virtual machine operates at a second remote device, and where the first remote device and the second remote device are different types of devices. In an example, the first application breaks when the first application running on the first virtual machine reaches a breakpoint, experiences an error, or experiences an exception.

DETAILED DESCRIPTION

Figure 1:
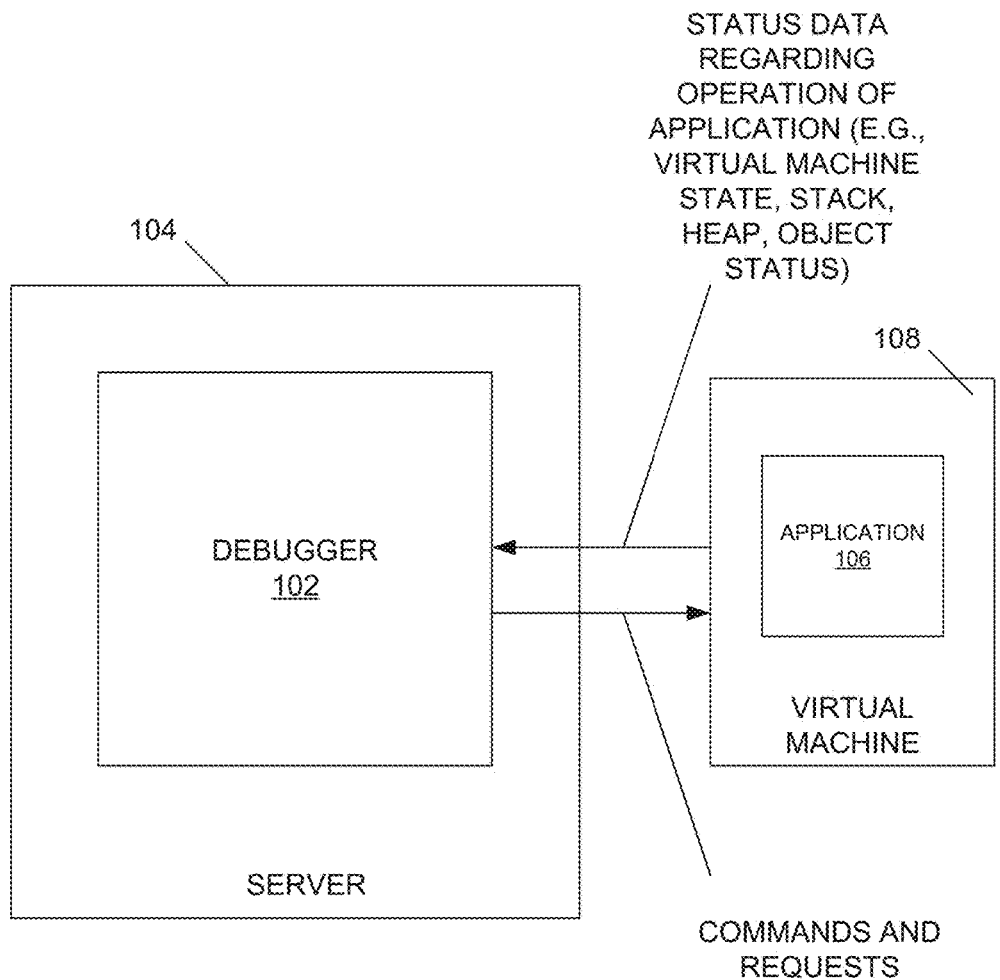
FIG. 1 is a diagram depicting a debugger server according to one embodiment of the disclosure.

FIG. 1 is a diagram depicting a debugger server according to one embodiment of the disclosure. The debugger 102 operates on a server 104 and accepts connections from one or more applications 106 operating on virtual machines 108. In the example of FIG. 1, one application 106 has connected to the debugger 102. Application 106 is operating on a virtual machine 108 that is operating on hardware external to the server 104. The debugger 102 is configured to send commands and requests. The debugger 102 is further configured to receive status data from the virtual server 108 and the application 106 operating on the virtual server 108. Correspondingly, the application 106 and the virtual machine 108 are configured to transmit status data concerning the current state of the system 106, 108 to the debugger 102 operating on the server 104. In one embodiment, the debugger 102 is configured to display the status data via a graphical user interface.

In one example, the debugger 102 operates as a stand-alone debugger with a graphical user interface operating on the server 104. In such an example, the server 104 can be a computer system running on an operating system (OS) such as Windows® or Mac OS X®. Embodiments described herein, however, are limited to any particular operating system. In such an example, the debugger 102 is designed to debug applications 106 (e.g., a JavaScript application) operating on the virtual machine 108 (e.g., an XS virtual machine). The debugger 102 operates as a server, and the virtual machines 108 operate as clients. In one example, status data flows from the application 106 to the debugger 102 when the application 106 operating on the virtual machine 108 breaks (e.g., because of breakpoints, errors, exceptions). Such status data provides information of the virtual machine 108, application 106 state, the heap, and the stack, etc. The debugger 102 displays some or all of the status data via a graphical user interface. The debugger 102 may also be configured to display a summary of the status data. In some implementations, the debugger 102 may also display the corresponding source code. When the virtual machine has broken, the debugger sends commands and requests to the virtual machine 108/application 106, including commands such as, although not limited to, running, stepping in and out, inspecting object status, and getting and setting breakpoints.

The debugger server architecture can provide a number of advantages over prior systems. For example, the present debugger server architecture can be particularly beneficial when the application being tested is operating on a constraint limited device, such as on a hardware chip. In such instances, available memory and storage for debugging code is often highly limited, sometimes in the 100s to 1000s of bytes. Traditionally, it is difficult to thoroughly debug such applications. Such traditional debugging efforts often rely on cumbersome external hardware debuggers (e.g., a Joint Test Action Group (JTAG) debugger). In contrast, the present debugger server architecture requires minimal to no overhead on the application side when the application is running. In certain examples, no additional services are required to allow an environment development to discover and connect to the application. The virtual machine only requires a trivial/thin client to connect to the debugger server (e.g., based on standard blocking sockets).

Figure 2:
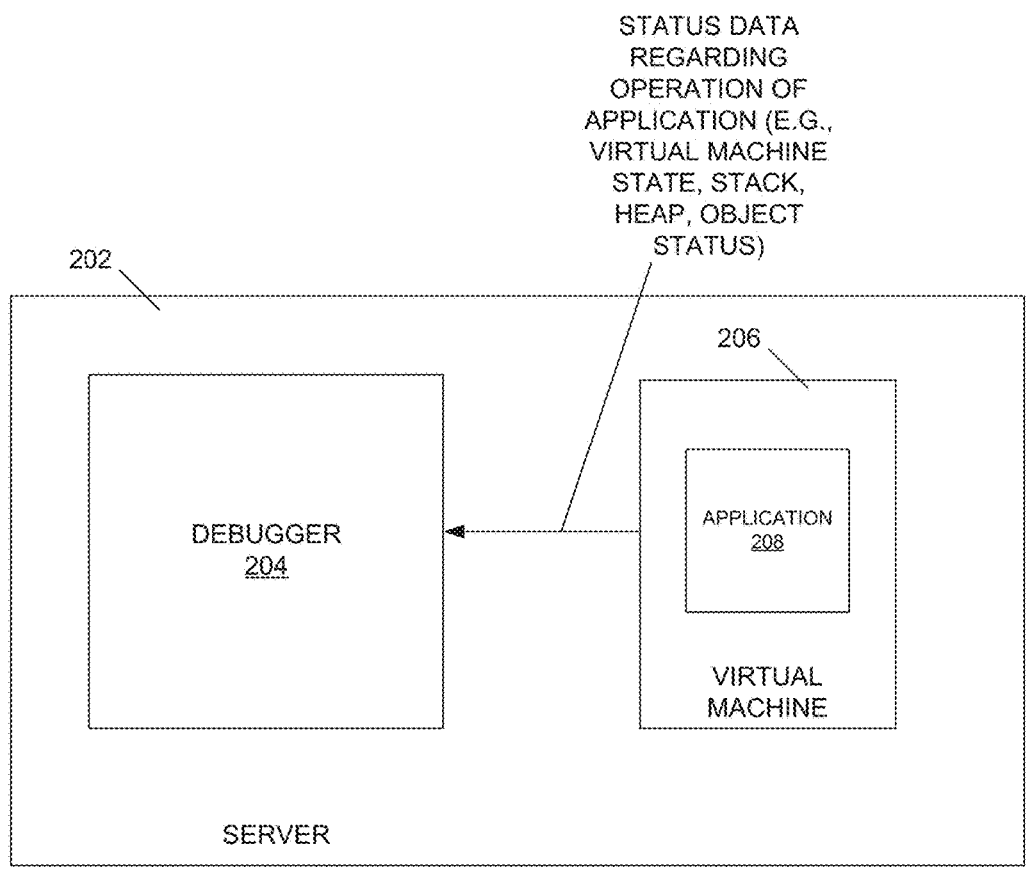
FIG. 2 is a block diagram depicting an example arrangement where the virtual machine operates on a same server as the debugger.

FIG. 2 is a block diagram depicting an example arrangement where the virtual machine operates on a same server as the debugger. In the arrangement of FIG. 2, a server 202 includes a debugger 204 and a virtual machine 206. An application 208 to be debugged operates within the virtual machine. Similar to the example of FIG. 1, the virtual machine 206/application 208 connect to the debugger 204 in a client/server-type relationship. The application 208 operates until the application 208 breaks, such as upon reaching a breakpoint or occurrence of an error. The virtual machine 206 then transmits status data to the debugger 204 for display, to update a programmer on the state of the application 206 execution. During the break, the debugger 204 may also transmit commands or additional requests to the virtual machine 206/application 208 to access more data or to direct further execution of the application 208.

Figure 3:
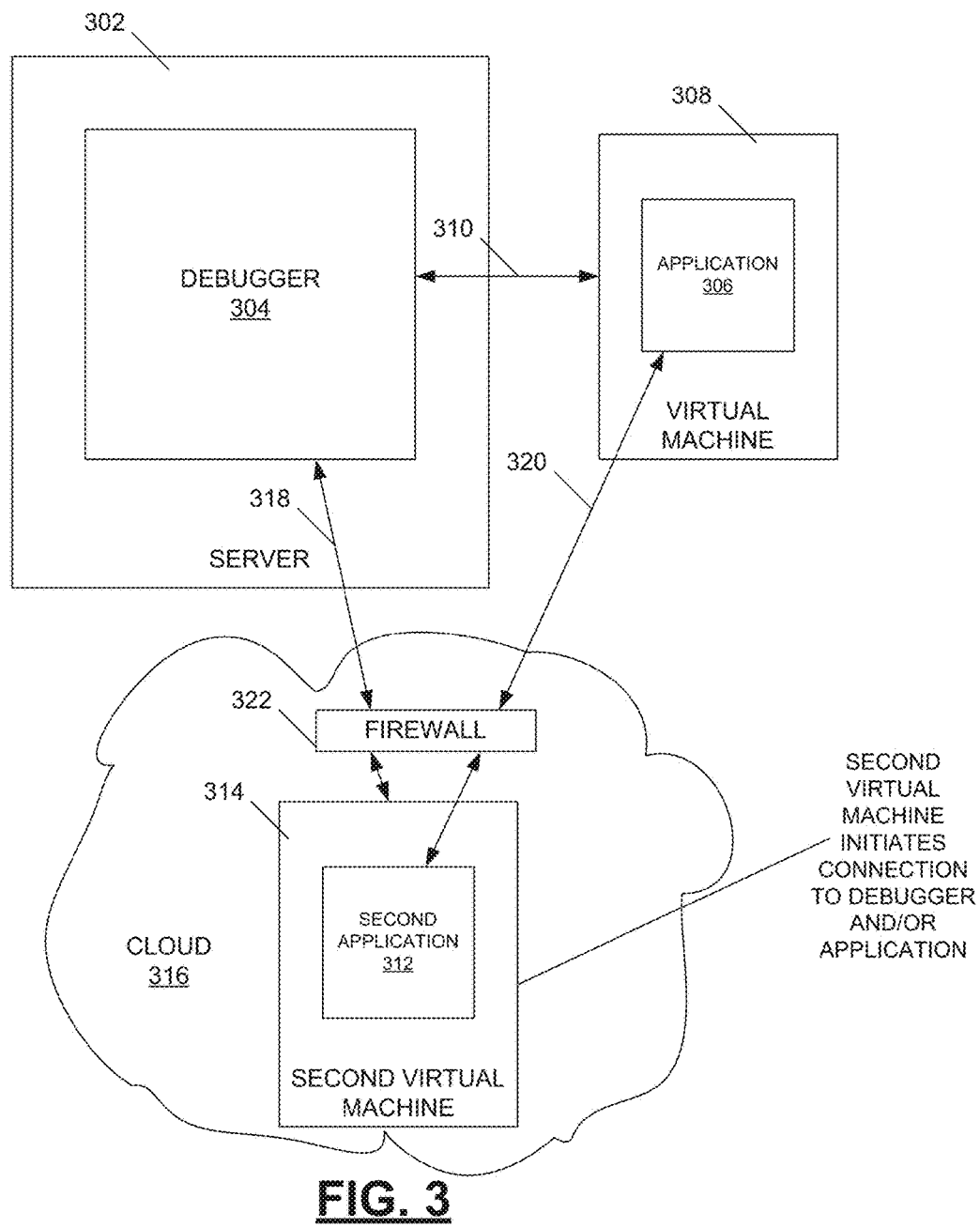
FIG. 3 is a diagram depicting a debugger server receiving connections from multiple applications and their corresponding virtual machines.

FIG. 3 is a diagram depicting a debugger server receiving connections from multiple applications and their corresponding virtual machines according to one implementation. The arrangement of FIG. 3 illustrates multiple additional advantages of the debugger server architecture. For example, the debugger server architecture facilitates testing of a common occurrence of modern application programming, where systems are designed for multiple applications to communicate and work together. Traditional systems utilize a debugger that debugs a single application at a time. Such constraints made it difficult to simulate real world communications among applications. This problem was further exacerbated when the real-world implementation included applications operated on disparate devices (e.g., a local device, a remote device within the local network, and a cloud device). The debugger server architecture, in one embodiment, enables multiple applications to operate in their normal environment communicating amongst one another by connecting to the debugger server and further communicating amongst one other to better mimic real-world operating conditions.

In FIG. 3, a server 302 implements a debugger 304. A first application 306 to be debugged operates on a first virtual machine 308 that runs external to the server 302. The first virtual machine 308/application 306 communicates status data to the debugger 304 and receives commands at 310, such as described above with respect to FIGS. 1 and 2. The example of FIG. 3 further includes a second application 312 operating on a second virtual machine 314. The second virtual machine 314 may operate at a different location, for example, in a cloud environment 316. The second virtual machine 314/second operation 312 initiates a connection 318 with the debugger 304 for transfer of state data and commands. The first application 306 and the second application 312 further establish a connection 320 to exchange data with each other, as they would in a real-world application. This capability allows the debugger 304 to ascertain data on the interactions of the applications 306, 312, data that would often be very difficult to capture using traditional debuggers.

The example of FIG. 3 illustrates an additional benefit. Typically, applications operating in the cloud 316 are positioned behind a firewall 322 relative to entities outside of the cloud 316. Such firewalls 322 tend to strictly limit incoming connections to entities in the cloud 316 but are more permissive for outgoing connections. Thus, these firewalls 322 would usually prevent a connection from the debugger 304 to the second virtual machine 314 in the framework of FIG. 3. However, the debugger server architecture receives a connection from the second virtual machine 314 to the debugger 304. This outgoing connection from the second virtual machine 314 to the debugger 304 and associated server 302 is permitted, where the reverse connection, initiated by the debugger 304, would not be permitted. This enables debugging of applications operating in certain environments (e.g., cloud environment 316) that would otherwise be difficult or impossible using traditional methods.

Figure 4:
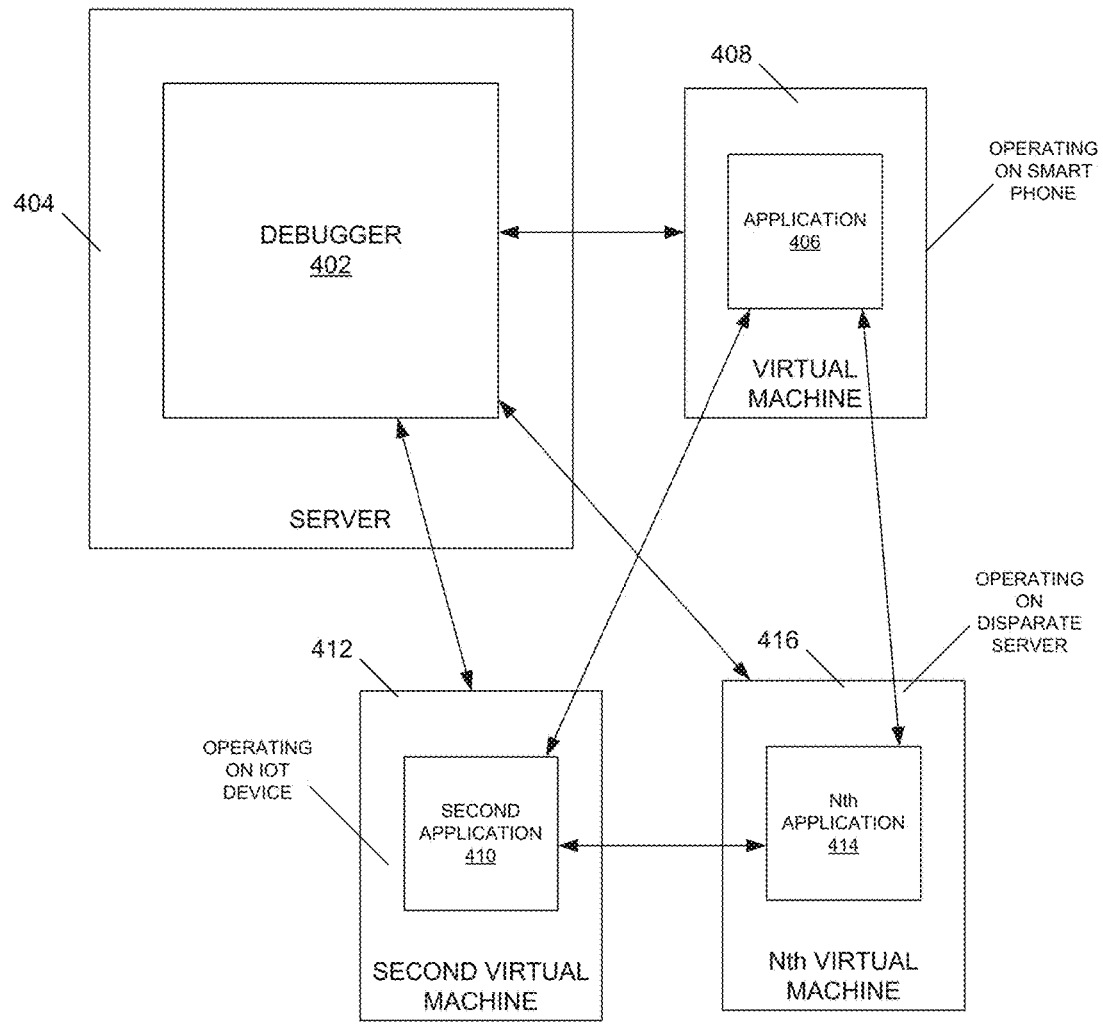
FIG. 4 is a diagram depicting connections of n applications to a debugger and each other, the n applications operating on devices of disparate type.

FIG. 4 is a diagram depicting connections of n applications to a debugger and each other, the n applications operating on devices of disparate type, according to one implementation. In the example of FIG. 4, a debugger 402 on a server 404 receives a first connection from a first application 406 operating on, for example, a smart phone virtual machine 408. The debugger 402 receives a second connection from a second application 410 operating on, for example, an internet of things (IOT) virtual server 412 that could be operating on a multitude of platforms (e.g., refrigerators, tennis shoes, thermostats, etc.). An $n^{th}$ application 414 operates on a virtual machine operating on a disparate server 416, illustrating that any number of applications could interact in a system, communicating data to a debugger 402 and associated server 404.

Figure 5:
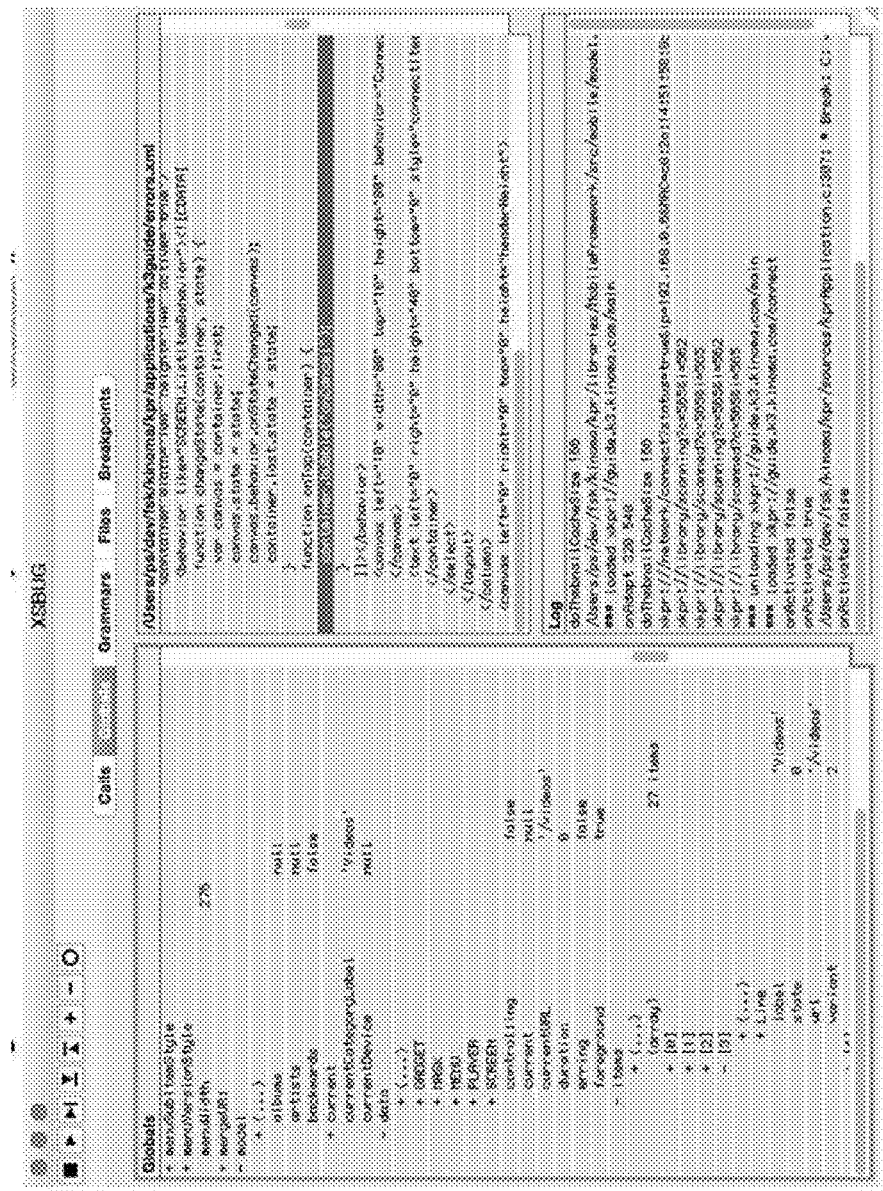
FIG. 5 is a diagram depicting a graphical user interface provided by a debugger server for identifying a state of an application being debugged.

FIG. 5 is a diagram depicting a graphical user interface provided by a debugger server for identifying a state of an application being debugged, according to one implementation. The user interface includes a left pane that identifies values associated with a number of properties of an application that are being tracked. An upper right pane identifies a portion of code where an error is deemed to have occurred. A lower right pane identifies contents of a log that contains data about operation of the application. Additional controls enable inspection of calls, grammars, file contents, and breakpoints. Further controls enable sending commands to the application including stop execution, execute, step in, step out, etc.

Figure 6:
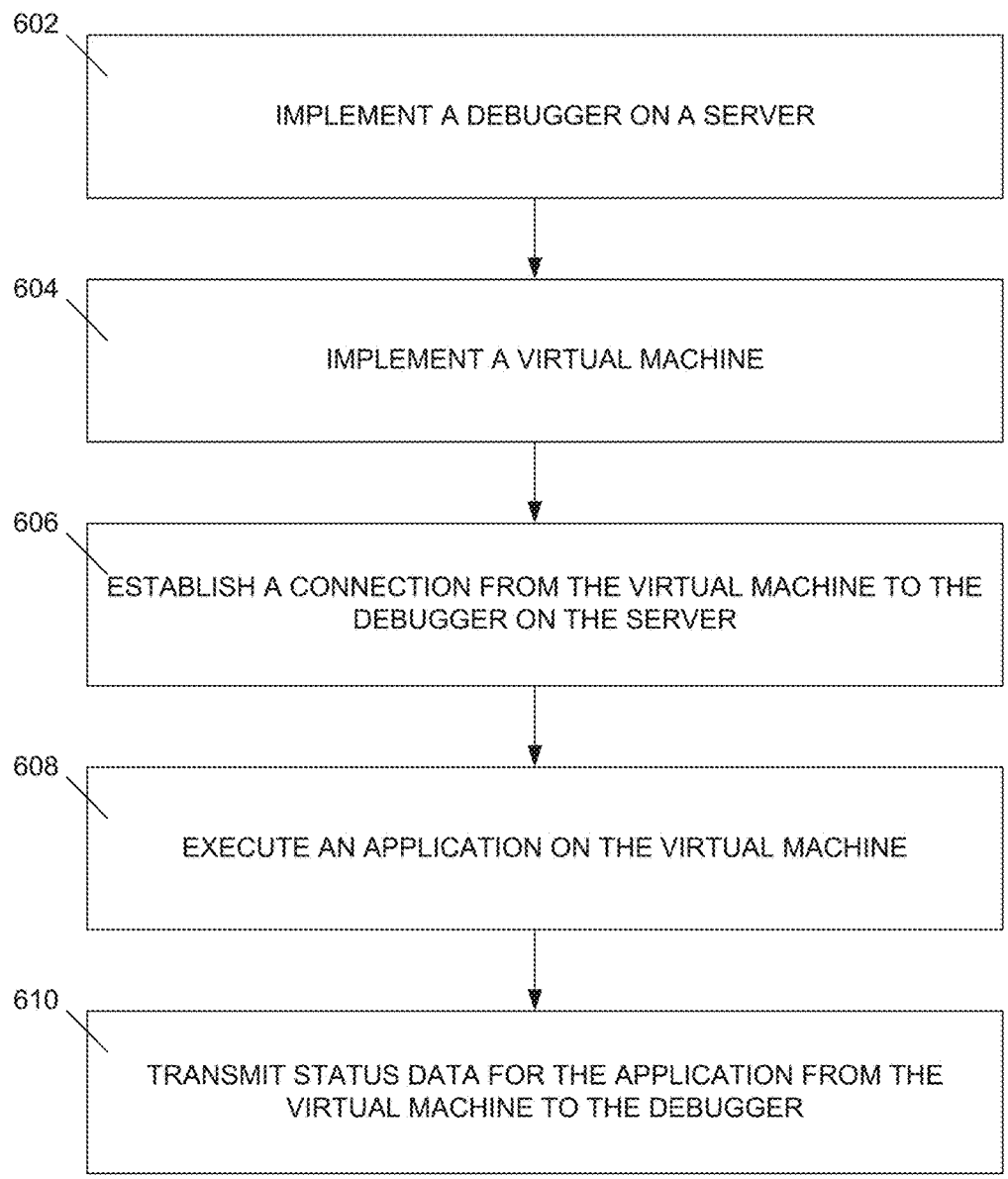
FIG. 6 is a flow diagram depicting a computer-implemented method of debugging an application.

FIG. 6 is a flow diagram depicting a computer-implemented method of debugging an application according to implementation. At 602, the method includes implementing a debugger on a server, the server comprising one or more processors and a computer-readable medium encoded with instructions, which when executed by the one or more processors, causes the server to perform the operations described herein. At 604, a virtual machine is implemented. At 606, a connection is established from the virtual machine to the debugger on the server, the connection being initiated by the virtual machine. At 608, an application is executed on the virtual machine, and at 610, status data for the application is transmitted from the virtual machine to the debugger, and the status data is displayed on a graphical user interface using the debugger.

Figure 7A:
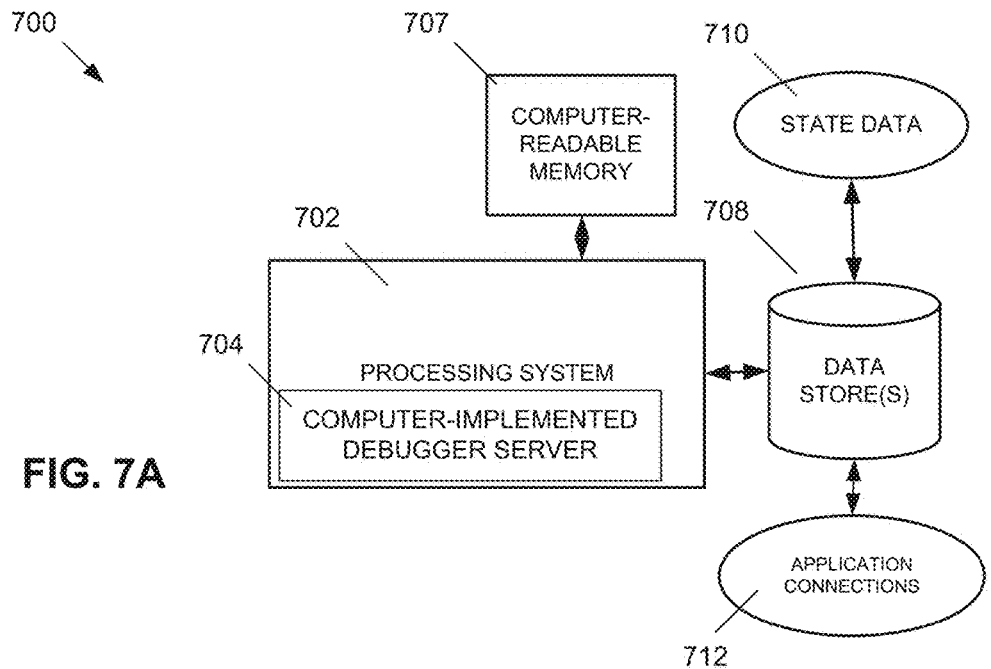
FIGS. 7A, 7B, and 7C depict example systems for implementing the approaches described herein for debugging an application.
Figure 7B:
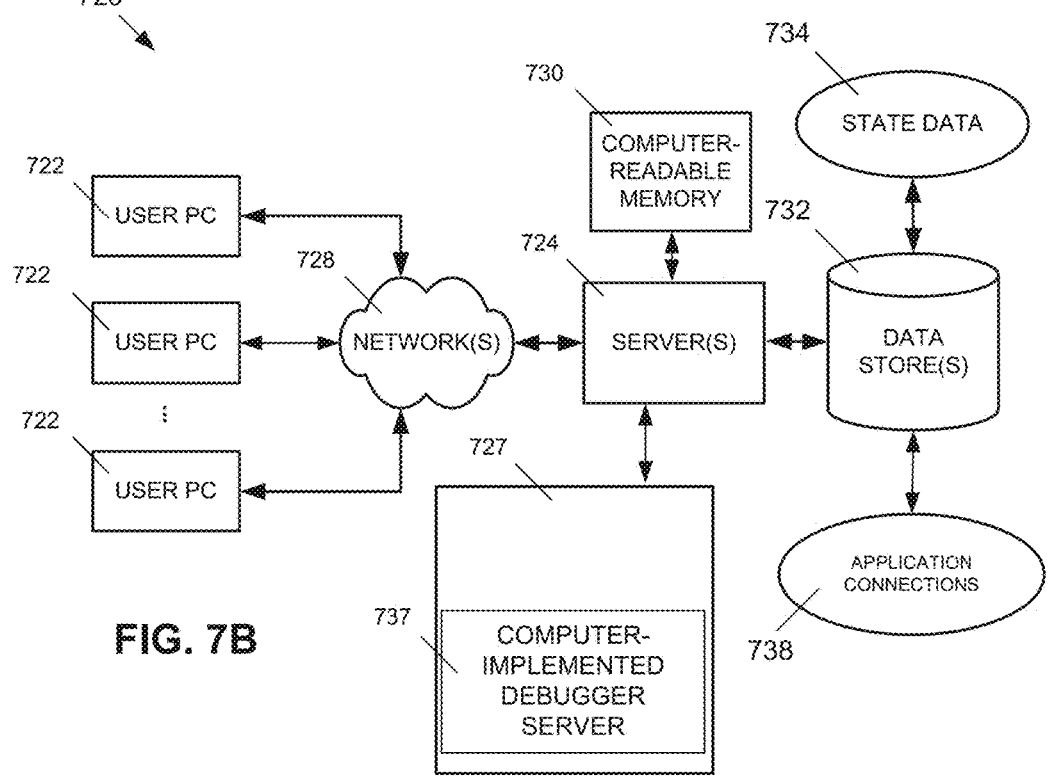
Figure 7C:
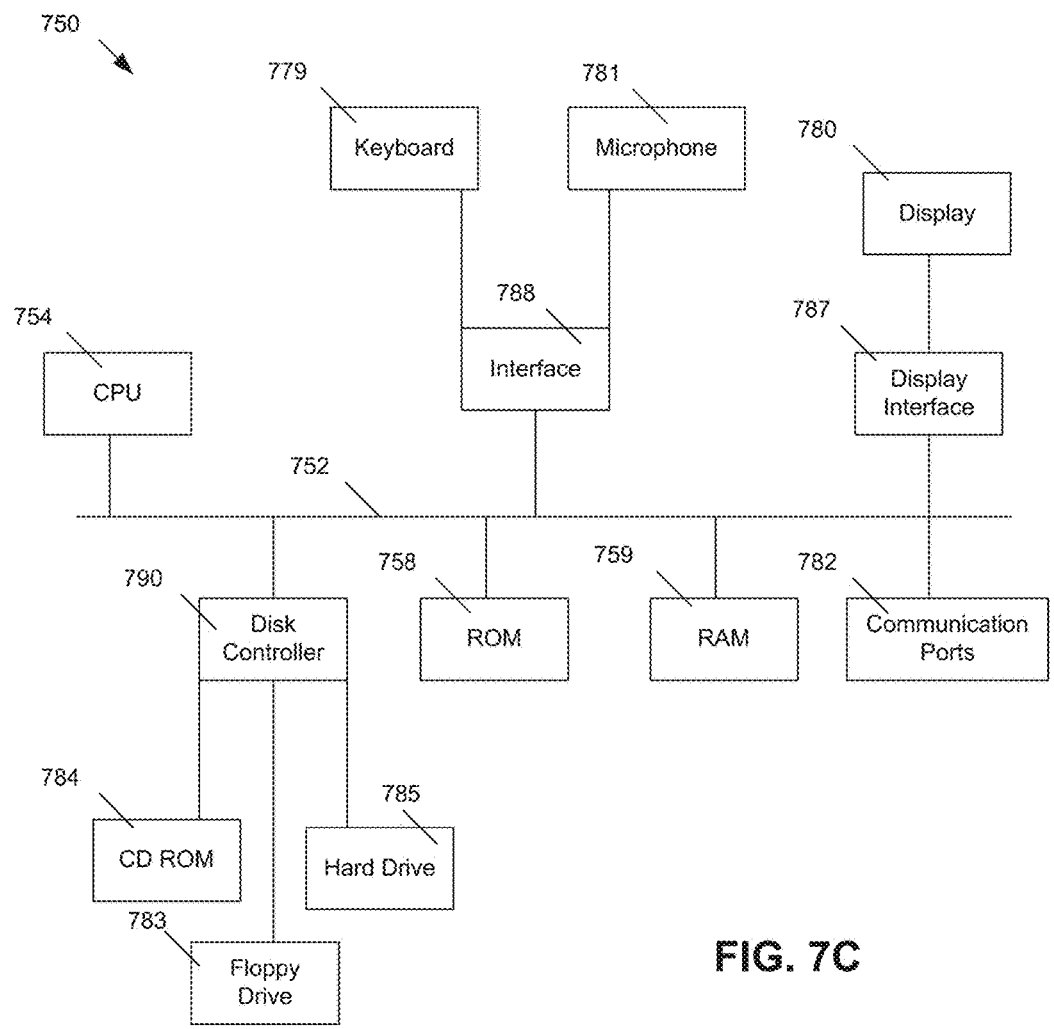

FIGS. 7A, 7B, and 7C depict example systems for implementing the approaches described herein for debugging an application. For example, FIG. 7A depicts an exemplary system 700 that includes a standalone computer architecture where a processing system 702 (e.g., one or more computer processors located in a given computer or in multiple computers that may be separate and distinct from one another) includes a debugger server 704 being executed on the processing system 702. The processing system 702 has access to a computer-readable memory 707 in addition to one or more data stores 708. The one or more data stores 708 may include captured state data 710 as well as data regarding applications connected to the debugger server 712. The processing system 702 may be a distributed parallel computing environment, which may be used to handle very large-scale data sets.

FIG. 7B depicts a system 720 that includes a client-server architecture. One or more user PCs 722 access one or more servers 724 running a debugger server 737 on a processing system 727 via one or more networks 728. The one or more servers 724 may access a computer-readable memory 730 as well as one or more data stores 732. The one or more data stores 732 may include captured state data 734 as well as data regarding applications connected to the debugger server 738.

FIG. 7C shows a block diagram of exemplary hardware for a standalone computer architecture 750, such as the architecture depicted in FIG. 7A that may be used to include and/or implement the program instructions of system embodiments of the present disclosure. A bus 752 may serve as the information highway interconnecting the other illustrated components of the hardware. A processing system 754 labeled CPU (central processing unit) (e.g., one or more computer processors at a given computer or at multiple computers), may perform calculations and logic operations required to execute a program. A non-transitory processor-readable storage medium, such as read only memory (ROM) 758 and random access memory (RAM) 759, may be in communication with the processing system 754 and may include one or more programming instructions for performing the method of debugging an application. Optionally, program instructions may be stored on a non-transitory computer-readable storage medium such as a magnetic disk, optical disk, recordable memory device, flash memory, or other physical storage medium.

In FIGS. 7A, 7B, and 7C, computer readable memories 707, 730, 758, 759 or data stores 708, 732, 783, 784, 788 may include one or more data structures for storing and associating various data used in the example systems for debugging an application. For example, a data structure stored in any of the aforementioned locations may be used to store data from XML files, initial parameters, and/or data for other variables described herein. A disk controller 790 interfaces one or more optional disk drives to the system bus 752. These disk drives may be external or internal floppy disk drives such as 783, external or internal CD-ROM, CD-R, CD-RW or DVD drives such as 784, or external or internal hard drives 785. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 790, the ROM 758 and/or the RAM 759. The processor 754 may access one or more components as required.

A display interface 787 may permit information from the bus 752 to be displayed on a display 780 in audio, graphic, or alphanumeric format. Communication with external devices may optionally occur using various communication ports 782.

In addition to these computer-type components, the hardware may also include data input devices, such as a keyboard 779, or other input device 781, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

For example, virtual machines, as described herein can be implemented in a variety of ways. In one example, a virtual machine (VM) is an emulation of a particular computer system. Such virtual machines operate based on the computer architecture and functions of a real or hypothetical computer, and their implementations may involve specialized hardware, software, or a combination of both.

Virtual machines can vary as to the degree to which they implement functionality of targeted real machines. System virtual machines (also known as full virtualization VMs) provide a complete substitute for the targeted real machine and a level of functionality required for the execution of a complete operating system. On the other hand, process virtual machines are designed to execute a single computer program by providing an abstracted and platform-independent program execution environment.

Different virtualization techniques can be used. One example, native execution, is based on direct virtualization of the underlying raw hardware, thus it provides multiple "instances" of the same architecture a real machine is based on, capable of running complete operating systems. Some virtual machines can also emulate different architectures and allow execution of software applications and operating systems written for another CPU or architecture. Operating-system-level virtualization allows the resources of a computer to be partitioned via a kernel's support for multiple isolated user space instances, which are usually called containers and may look and feel like real machines to the end users or applications operating thereon.

What is claimed is:

1. A server for debugging applications, the server comprising:
   a non-transitory machine-readable storage medium to store code; and
   a processor coupled to the non-transitory machine-readable storage medium, the processor operative to execute the code, the code including:
      a debugger configured to:
         establish a first connection with a first virtual machine, wherein the first virtual machine is configured to initiate the first connection with the debugger,
         receive, from the first virtual machine, a first set of data via the first connection established between the debugger and the first virtual machine, wherein the first set of data includes data associated with a first application running on the first virtual machine, and wherein the first virtual machine is further configured to transmit the first set of data to the debugger when the first application breaks, and
         display, on a graphical user interface (GUI), at least a portion of the first set of data received from the first application running on the first virtual machine.

2. The server of claim 1, wherein the code further includes the first virtual machine.

3. The server of claim 1, wherein the first virtual machine operates at a first remote device.

4. The server of claim 3, wherein the server and the first remote device communicate with each other via a firewall.

5. The server of claim 1, wherein the first set of data further includes data associated with one or more of: (i) a state of the first virtual machine, (ii) a heap of the first virtual machine, or (iii) a stack of the first virtual machine.

6. The server of claim 1, wherein the debugger is further configured to send one or more commands to the first virtual machine after the first application breaks.

7. The server of claim 6, wherein the one or more commands includes one or more of: (i) a command to run the first application, (ii) a command to step a source code associated with the first application, (iii) a command to request for object status, or (iv) a command to set a breakpoint in the first application.

8. The server of claim 1, wherein the debugger is further configured to:

establish a second connection with a second virtual machine, wherein the second virtual machine is configured to initiate the second connection with the debugger;

receive, from the second virtual machine, a second set of data via the second connection established between the debugger and the second virtual machine, wherein the second set of data includes data associated with a second application running on the second virtual machine, and wherein the second virtual machine is further configured to transmit the second set of data to the debugger when the second application breaks;

display, on the GUI, at least a portion of the second set of data received from the second application running on the second virtual machine; and wherein the first application and the second application are configured to communicate with each other, thereby allowing the first application and the second application to be debugged while operating in their normal environment.

9. The server of claim 8, wherein the first virtual machine operates at a first remote device, the second virtual machine operates at a second remote device, and wherein the first remote device and the second remote device are different types of devices.

10. The server of claim 1, wherein the first application breaks when the first application running on the first virtual machine reaches a breakpoint, experiences an error, or experiences an exception.

11. A method performed by a debugger operating at a server for debugging applications, the method comprising:
establishing a first connection with a first virtual machine, wherein the first virtual machine is configured to initiate the first connection with the debugger;

receiving, from the first virtual machine, a first set of data via the first connection established between the debugger and the first virtual machine, wherein the first set of data includes data associated with a first application running on the first virtual machine, and wherein the first virtual machine is further configured to transmit the first set of data to the debugger when the first application breaks; and displaying, on a graphical user interface (GUI), at least a portion of the first set of data received from the first application running on the first virtual machine.

12. The method of claim 11, wherein the first virtual machine operates at the server.

13. The method of claim 11, wherein the first virtual machine operates at a first remote device.

14. The method of claim 11, wherein the server and the first remote device communicate with each other via a firewall.

15. The method of claim 11, wherein the first set of data further includes data associated with one or more of: (i) a state of the first virtual machine, (ii) a heap of the first virtual machine, or (iii) a stack of the first virtual machine.

16. The method of claim 11, further comprising sending one or more commands to the first virtual machine after the first application breaks.

17. The method of claim 16, wherein the one or more commands includes one or more of: (i) a command to run the first application, (ii) a command to step a source code associated with the first application, (iii) a command to request for object status, or (iv) a command to set a breakpoint in the first application.

18. The method of claim 11, further comprising:
establishing a second connection with a second virtual machine, wherein the second virtual machine is configured to initiate the second connection with the debugger;

receiving, from the second virtual machine, a second set of data via the second connection established between the debugger and the second virtual machine, wherein the second set of data includes data associated with a second application running on the second virtual machine, and wherein the second virtual machine is further configured to transmit the second set of data to the debugger when the second application breaks;

displaying, on the GUI, at least a portion of the second set of data received from the second application running on the second virtual machine; and wherein the first application and the second application are configured to communicate with each other, thereby allowing the first application and the second application to be debugged while operating in their normal environment.

19. The method of claim 18, wherein the first virtual machine operates at a first remote device, the second virtual machine operates at a second remote device, and wherein the first remote device and the second remote device are different types of devices.

20. A non-transitory machine-readable storage medium having computer code stored therein, the computer code including:
a debugger configured to:
establish a first connection with a first virtual machine, wherein the first virtual machine is configured to initiate the first connection with the debugger, receive, from the first virtual machine, a first set of data via the first connection established between the debugger and the first virtual machine, wherein the first set of data includes data associated with a first application running on the first virtual machine, and wherein the first virtual machine is further configured to transmit the first set of data to the debugger when the first application breaks, and display, on a graphical user interface (GUI), at least a portion of the first set of data received from the first application running on the first virtual machine.

21. The non-transitory machine-readable storage medium of claim 19, wherein the debugger is further configured to:
establish a second connection with a second virtual machine, wherein the second virtual machine is configured to initiate the second connection with the debugger;

receive, from the second virtual machine, a second set of data via the second connection established between the debugger and the second virtual machine, wherein the second set of data includes data associated with a second application running on the second virtual machine, and wherein the second virtual machine is further configured to transmit the second set of data to the debugger when the second application breaks;

display, on the GUI, at least a portion of the second set of data received from the second application running on the second virtual machine; and wherein the first application and the second application are configured to communicate with each other, thereby allowing the first application and the second application to be debugged while operating in their normal environment.

* * * * *